US012663962B2

(12) United States Patent (10) Patent No.: US 12,663,962 B2
Barash et al. (45) Date of Patent: Jun. 23, 2026

(54) METADATA JOURNAL FOR A STORAGE SYSTEM

(71) Applicant: HEWLETT PACKARD ENTERPRISE DEVELOPMENT LP, Spring, TX (US)

(72) Inventors: Gil Barash, Herzliya (IL); Maya Leshem, Herzliya (IL); Shlomi Apel, Herzliya (IL); Asaf Kariv, Herzliya (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/921,281

(22) Filed: Oct. 21, 2024

(65) Prior Publication Data

US 2026/0111172 A1 Apr. 23, 2026

(51) Int. Cl.
*G06F 16/00* (2019.01)
*G06F 7/08* (2006.01)
*G06F 16/245* (2019.01)
(52) U.S. Cl.
CPC .............. *G06F 7/08* (2013.01); *G06F 16/245* (2019.01)
(58) Field of Classification Search
CPC .................................. G06F 7/08; G06F 16/245
See application file for complete search history.

(56) References Cited

U.S. PATENT DOCUMENTS

| | | | |
|---|---|---|---|
| 8,832,037 B2 | 9/2014 | Boldo et al. | |
| 9,047,296 B2 | 6/2015 | Pawar | |
| 9,256,498 B1 | 2/2016 | Leibowitz et al. | |
| 10,481,988 B2 | 11/2019 | Mamluk | |
| 10,642,637 B2 | 5/2020 | Kedem et al. | |
| 10,649,868 B2 | 5/2020 | Or et al. | |
| 11,334,548 B2 | 5/2022 | Kuimelis et al. | |
| 11,650,842 B2 | 5/2023 | Kedem et al. | |
| 2024/0036978 A1 | 2/2024 | Ben-Or et al. | |

OTHER PUBLICATIONS

Atlassian, "Multicolumn Indexes," accessed Apr. 16, 2024, < https://www.atlassian.com/data/sql/multicolumn-indexes>, 10 pages.

*Primary Examiner* — Paul Kim
(74) *Attorney, Agent, or Firm* — Trop, Pruner & Hu, P.C.

(57) ABSTRACT

An example includes receiving a read request specifying a target range and a target checkpoint, and executing a first query to retrieve a first entry of a metadata table. The first entry is a most recent entry of those entries that are older than the target checkpoint and record write ranges overlapping the target range. The example also includes, if the write range in the first entry does not cover all of the target range, determining a remaining portion of the target range that excludes the write range in the first entry. The example also includes executing a second query to retrieve a second entry of the metadata table, where the second entry is a most recent record in a second subset of entries that are older that the target checkpoint and record write ranges overlapping the remaining portion of the target location range.

20 Claims, 10 Drawing Sheets

100

| Metadata Table 200 | | | |
|---|---|---|---|
| Identifier 210 | Address 230 | Location 240 | Checkpoint 250 |
| -- | -- | -- | -- |
| -- | -- | -- | -- |
| -- | -- | -- | -- |

1st Sequence 400

| Metadata Table 200 | | | | |
|---|---|---|---|---|
| ID | Data | Addr. | Location | Checkpoint |
| 1 | A | J1 | L7-L8 | C-1 |
| 2 | B | J2 | L2-L3 | C-1 |
| | | | | |

Data Journal 180

Storage Volume 150

2nd Sequence 402

| Metadata Table 200 | | | | |
|---|---|---|---|---|
| ID | Data | Addr. | Location | Checkpoint |
| 1 | A | J1 | L7-L8 | C-1 |
| 2 | B | J2 | L2-L3 | C-1 |
| 3 | C | J3 | L1-L2 | C-2 |
| 4 | D | J4 | L5-L6 | C-2 |

Data Journal 180

Storage Volume 150

3rd Sequence 404

| Metadata Table 200 | | | | |
|---|---|---|---|---|
| ID | Data | Addr. | Location | Checkpoint |
| 1 | A | J1 | L7-L8 | C-1 |
| 2 | B | J2 | L2-L3 | C-1 |
| 3 | C | J3 | L1-L2 | C-2 |
| 4 | D | J4 | L5-L6 | C-2 |
| 5 | E | J5 | L4-L5 | C-3 |
| 6 | F | J6 | L2-L3 | C-3 |
| 7 | G | J7 | L2-L3 | C-4 |
| 8 | H | J8 | L3-L4 | C-4 |

Data Journal
180

Storage
Volume 150

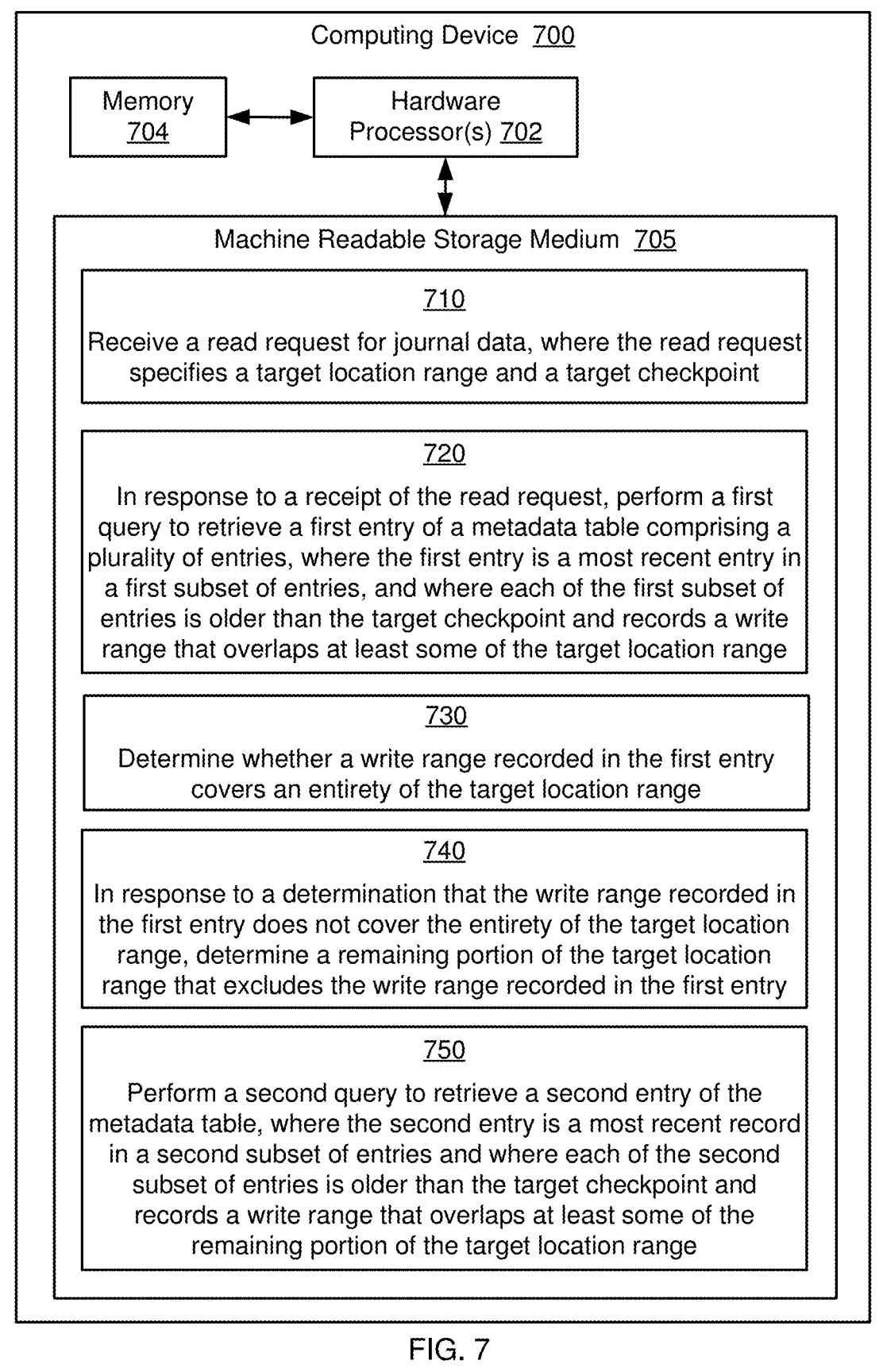

Computing Device <u>700</u>

| Memory <u>704</u> | ⟷ | Hardware Processor(s) <u>702</u> |

Machine Readable Storage Medium <u>705</u>

<u>710</u>
Receive a read request for journal data, where the read request specifies a target location range and a target checkpoint <u>720</u>
In response to a receipt of the read request, perform a first query to retrieve a first entry of a metadata table comprising a plurality of entries, where the first entry is a most recent entry in a first subset of entries, and where each of the first subset of entries is older than the target checkpoint and records a write range that overlaps at least some of the target location range <u>730</u>
Determine whether a write range recorded in the first entry covers an entirety of the target location range <u>740</u>
In response to a determination that the write range recorded in the first entry does not cover the entirety of the target location range, determine a remaining portion of the target location range that excludes the write range recorded in the first entry <u>750</u>
Perform a second query to retrieve a second entry of the metadata table, where the second entry is a most recent record in a second subset of entries and where each of the second subset of entries is older than the target checkpoint and records a write range that overlaps at least some of the remaining portion of the target location range

FIG. 7

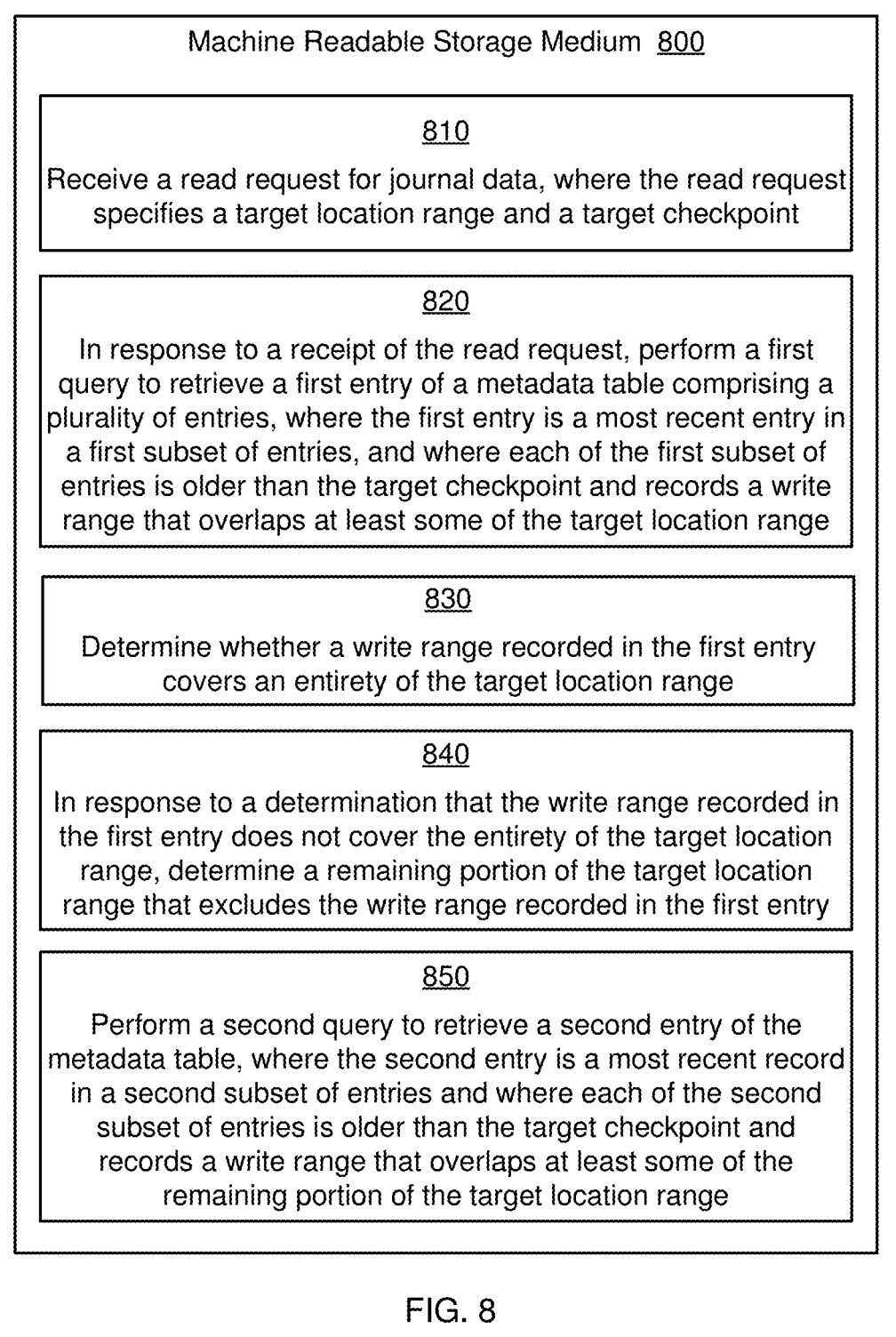

Machine Readable Storage Medium  800

810

Receive a read request for journal data, where the read request specifies a target location range and a target checkpoint

820

In response to a receipt of the read request, perform a first query to retrieve a first entry of a metadata table comprising a plurality of entries, where the first entry is a most recent entry in a first subset of entries, and where each of the first subset of entries is older than the target checkpoint and records a write range that overlaps at least some of the target location range

830

Determine whether a write range recorded in the first entry covers an entirety of the target location range

840

In response to a determination that the write range recorded in the first entry does not cover the entirety of the target location range, determine a remaining portion of the target location range that excludes the write range recorded in the first entry

850

Perform a second query to retrieve a second entry of the metadata table, where the second entry is a most recent record in a second subset of entries and where each of the second subset of entries is older than the target checkpoint and records a write range that overlaps at least some of the remaining portion of the target location range

FIG. 8

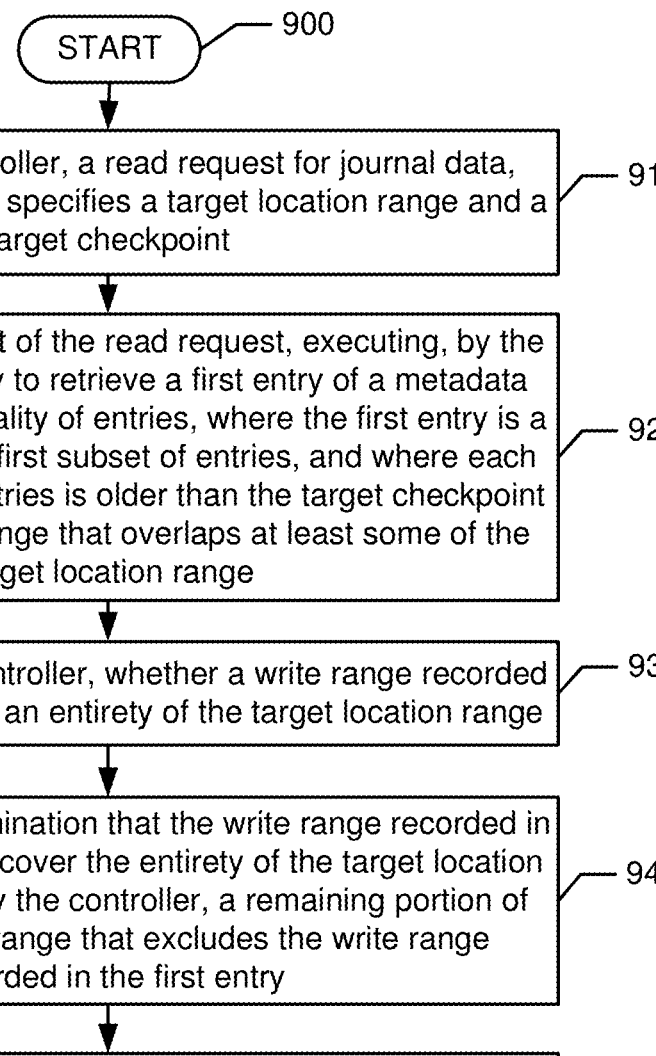

START ⟋— 900

Receiving, by a controller, a read request for journal data, where the read request specifies a target location range and a target checkpoint ⟋— 910

In response to a receipt of the read request, executing, by the controller, a first query to retrieve a first entry of a metadata table comprising a plurality of entries, where the first entry is a most recent entry in a first subset of entries, and where each of the first subset of entries is older than the target checkpoint and records a write range that overlaps at least some of the target location range ⟋— 920

Determining, by the controller, whether a write range recorded in the first entry covers an entirety of the target location range ⟋— 930

In response to a determination that the write range recorded in the first entry does not cover the entirety of the target location range, determining, by the controller, a remaining portion of the target location range that excludes the write range recorded in the first entry ⟋— 940

Executing, by the controller, a second query to retrieve a second entry of the metadata table, where the second entry is a most recent record in a second subset of entries, and where each of the second subset of entries is older that the target checkpoint and records a write range that overlaps at least some of the remaining portion of the target location range ⟋— 950

END

FIG. 9

METADATA JOURNAL FOR A STORAGE SYSTEM

BACKGROUND

Computing devices may include components such as a processor, memory, caching system, and storage device. The storage device may include a hard disk drive that uses a magnetic medium to store and retrieve data blocks. Some storage systems may transfer data between different locations or devices. For example, some systems may transfer and store copies of important data for archival and recovery purposes.

BRIEF DESCRIPTION OF THE DRAWINGS

Some implementations are described with respect to the following figures.

FIG. 7 is a schematic diagram of an example computing device, in accordance with some implementations.

FIG. 8 is a diagram of an example machine-readable medium storing instructions in accordance with some implementations.

FIG. 9 is an illustration of an example process, in accordance with some implementations.

Figures 1, 2:
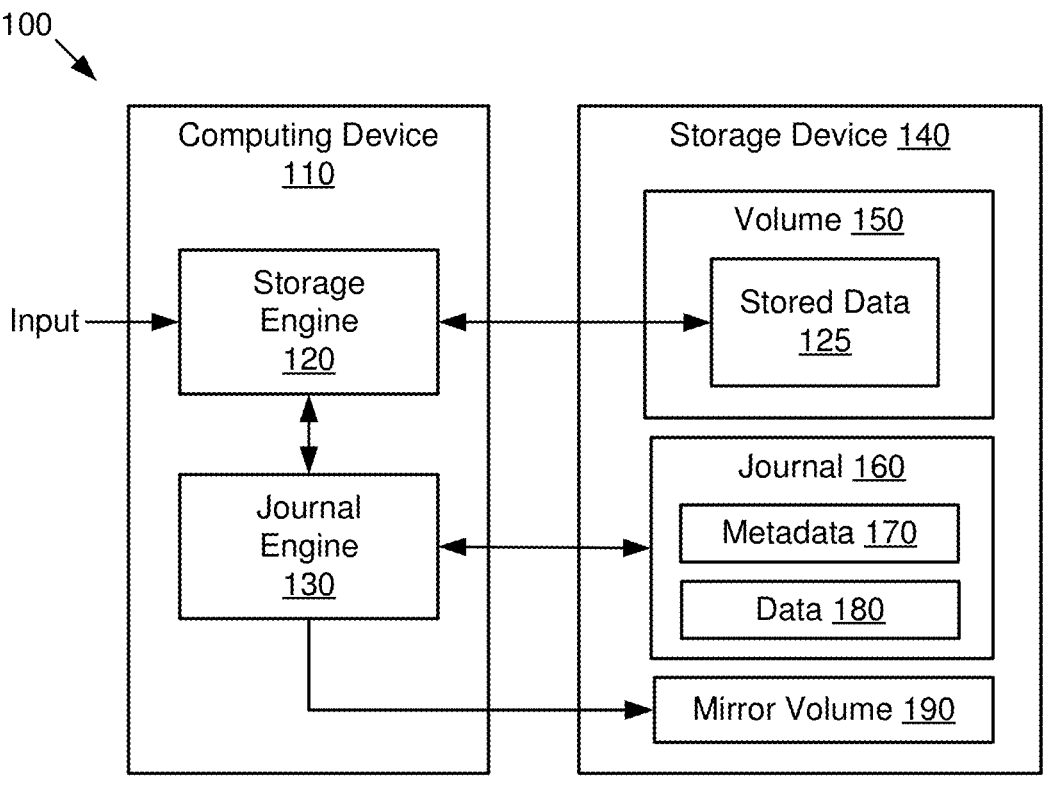
FIG. 1 is a schematic diagram of an example storage system, in accordance with some implementations.
FIG. 2 is an illustration of an example data structure, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a computing system may persistently store data in one or more storage devices. For example, a server may store a collection of data on a local storage array, and may also store a backup copy of the collection of data in a remote backup device. In some examples, the backup copy may be stored in a different form than the collection of data. For example, the backup copy may comprise a deduplicated representation of the collection of data. As used herein, a "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data.

In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof. As used herein, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a collection of data may be stored on a block-based storage system. As used herein, a "block-based" storage system may refer to a system that stores data in the form of data blocks (also referred to herein as "block level"). In some examples, a block level may be a level at which a block-based storage device (e.g., a hard disk drive (HDD), solid state drive (SSD), or the like) or a virtual volume may store data thereon. The block-based storage device may receive the data blocks making up a collection of data as a stream of data blocks.

In some examples, a journal may provide continuous data protection (CDP) for a storage system. The journal may be implemented as a sequential log of entries that store copies or details of block level writes performed on the storage system. For example, each entry may record the data blocks that were written to a storage volume, and the storage address(es) that the data blocks were written to (e.g., an offset and length in the storage volume). As such, the journal may form a historical record of all data written to the storage system. Further, the journal may record or indicate journal events (referred to herein as "checkpoints") that represent various fixed points in time. If the stored data becomes corrupted (e.g., by a malware attack), the entries of the journal may be read and then used to reconstruct the stored data as it existed at a point in time represented by a checkpoint. In some examples, this data reconstruction may involve reading and processing a set of journal entries, beginning from an oldest journal entry and ending at the desired checkpoint. However, if this set of journal entries has a relatively large size (e.g., if a relatively large number of data writes have been recorded between the initialization of the journal and the desired checkpoint), the data reconstruction may consume a significant amount of processing and network resources.

In accordance with some implementations of the present disclosure, a metadata journal may record information regarding data writes to a block volume. Further, a data journal may store copies of the data blocks written to the volume. The metadata journal may be implemented as a database table (or similar data structure) that can include multiple metadata entries (i.e., records or rows). For example, each metadata entry may store a reference to the copy of the data (stored in the data journal) that was written in the data write. Further, each metadata entry may record a volume address or range (e.g., an offset and length) where the data was written. Furthermore, in some implementations, each metadata entry may record an identifier of the most recent checkpoint that preceded the creation of that entry.

When there is a need to reconstruct the data, a database query is executed for a target address range and a target checkpoint. The query returns the entry for the most recent data write that overlaps the target range, and also precedes the target checkpoint. If the address recorded in the returned entry does not cover the entire target range, the target range is modified to remove the portion recorded in the returned entry, and the query is repeated using the modified target range. This query process may be repeated until obtaining results that cover the entire target range. In this manner, the journal may be used to perform data reconstruction in a relatively fast and efficient manner, thereby reducing the use of processing and network resources. Various aspects of the disclosed technique are discussed further below with reference to FIGS. 1-9.

FIGS. 1-2—Example Storage System

FIG. 1 shows an example storage system 100 including a computing device 110 and a storage device 140, in accordance with some implementations. The computing device 110 may include a storage engine 120 to generate and/or transmit write operations to the storage device 140. For example, the storage engine 120 may receive an input data stream ("Input"), and in response may send a block based write to the storage device 140. The input may specify a filesystem operation (e.g., adding a new file, deleting an existing directory, moving an existing file, etc.). The write operation may cause stored data 125 (e.g., data and/or metadata blocks) to be written to a specified address or location in a particular volume 150 of the storage device 140.

In some implementations, the journal engine 130 may generate or update a journal 160, and may store some or all of the journal 160 in the storage device 140. The journal 160 may include a metadata journal 170 and a data journal 180. In some implementations, the data journal 180 may be a data structure to store copies of the stored data 125 (e.g., the data blocks written to the volume 150). Further, the metadata journal 170 may be a data structure to store information (i.e., metadata) regarding the write operations to the storage device 140. In some implementations, the metadata journal 170 may also record or indicate checkpoints to represent various points in time.

In some implementations, the metadata journal 170 may be a database table that includes multiple entries. For example, referring to FIG. 2, shown is a metadata table 200 that corresponds generally to an example implementation of the metadata journal 170. Each entry of the metadata table 200 may record one or more metadata fields for a different write operation performed by the storage engine 120. For example, each entry may include an entry identifier ("Identifier") 210, a journal address ("Address") 230, a storage location ("Location") 240, and a checkpoint identifier ("Checkpoint") 250. The journal address 230 may be a reference (e.g., a pointer) to a data copy stored in the data journal 180 (i.e., a copy of the data that was written in the write operation). The storage location 240 may indicate the storage address range (e.g., and offset and length) in the volume 150 that the data was written to. The checkpoint identifier 250 may indicate the most recent checkpoint that preceded the creation of that entry. In some implementations, the entry may include an entry identifier 210 that uniquely identifies that entry. However, in other implementations, the entry may not include an entry identifier 210, and instead may be indexed or identified by the position of the entry (e.g., a row number) in the metadata table 200. An example process for generating the metadata table 200 is described below with reference to FIGS. 3 and 4A-4C.

Note that, while FIG. 2 shows one example of the metadata table 200, implementations are not limited in this regard. For example, in some implementations, the storage location field 240 may be replaced by two fields, namely a starting offset field (e.g., indicating a starting offset from a beginning of the volume) and an ending offset field (e.g., indicating a ending offset from the beginning of the volume). Further, it is contemplated that the metadata table 200 may include additional fields or elements, such as a journal type field (e.g., indicating whether the metadata table 200 contains information regarding writes performed to the volume 150, or writes performed during a fail-over process), an item type (e.g., indicating whether the data write is compressed or uncompressed), a compressed length field (e.g., indicating the compressed length for a compressed write), and the like. Furthermore, it is contemplated that the metadata table 200 may include fewer fields, different fields, and so forth. Additionally, it is contemplated that the functionality of the metadata table 200 may be implemented in other types of data structures (e.g., a flat file, XML file, and so forth). In some alternative implementations, the metadata table 200 may be configured to include both the metadata journal 170 and a data journal 180 (shown in FIG. 1). For example, in such alternative implementations, the journal address field 230 may be replaced with a field that stores the data copy itself (i.e., instead of storing the data copy in a data journal 180).

Referring again to FIG. 1, in some implementations, when some entries of the journal 160 reach a maximum age, those entries may be removed from the journal 160. Further, the removed entries may be used to generate a mirror volume 170. The mirror volume 170 may be a copy of the storage volume 150 as it existed at the time that those removed entries were added to the journal 160. For example, the writes recorded in the removed entries may be applied (e.g., executed) in their recorded order to the mirror volume 170.

In some implementations, the journal engine 130 may use the journal 160 to reconstruct the storage volume 150 as it existed at a point in time represented by a checkpoint. For example, in the event that the storage volume 150 becomes corrupted or lost (e.g., due to device failure or a malware attack), the journal engine 130 may execute a database query to retrieve journal data for a target address range and a target checkpoint. The query may select (and return metadata from) a single journal entry of the metadata journal 170 that corresponds to the most recent data write to a storage location range that overlaps the target range, and also precedes the target checkpoint. As used herein, a storage location range "overlaps" the target range if any portion of the target range is also included in any portion of the storage location range. The journal engine 130 may read the storage location range (from the single journal entry selected by the query), and may determine whether that storage location range covers the entire target range. As used herein, a storage location range "covers" the entire target range if the storage location range includes at least every portion of the target range (e.g., the target range is a sub-portion of the storage location range, or the target range is identical to storage location range). If the journal engine 130 determines that the storage location range (from the single journal entry selected by the query) does not cover the entire target range, the target range may be modified to remove the storage location range, and the query may be repeated using the modified target range. This query process may be repeated until obtaining results that cover the entire target range. In this manner, the journal engine 130 and the journal 160 may be used to reconstruct a volume at a checkpoint in a relatively fast and efficient manner, and may thereby provide an efficient allocation of processing and network resources. An example process for data reconstruction using the journal 160 is described below with reference to FIGS. 5 and 6.

In some implementations, the journal engine 130 may be implemented as part of (or along with) a database engine (not shown in FIG. 1). As used herein, a "database engine" may refer to instructions on at least one machine-readable storage medium executable by at least one processor to manage a structured database using a query language. For example, a database engine may process queries defined using structured query language (SQL) to load and retrieve records from a database table.

In some implementations, the storage engine 120 and/or the journal engine 130 may be implemented via hardware (e.g., electronic circuitry) or a combination of hardware and programming (e.g., comprising at least one processor and instructions executable by the at least one processor). In implementations using executable instructions, such instructions may be stored in machine-readable storage media (e.g., storage device 140), in hardware (e.g., circuitry), and so forth. The storage device 140 may include one or more non-transitory storage media such as hard disk drives (HDDs), solid state drives (SSDs), optical disks, and so forth, or a combination thereof. Further, in some implementations, the storage device 140 may include one or more block based storage devices.

In some implementations, the computing device 110 may be a physical computing device (e.g., server, appliance, desktop, etc.). For example, the computing device 110 may include a controller, memory, and persistent storage (not shown in FIG. 1). The controller may be implemented via hardware (e.g., electronic circuitry) or a combination of hardware and programming (e.g., comprising at least one processor and instructions executable by the at least one processor and stored on at least one machine-readable storage medium). The memory may be implemented in semiconductor memory such as random access memory (RAM). The persistent storage may include one or more non-transitory storage media such as hard disk drives (HDDs), solid state drives (SSDs), optical disks, and so forth, or a combination thereof. In other implementations, the computing device 110 may be one or more virtual computing devices (e.g., virtual machines, containers, etc.). For example, the storage engine 120 may be implemented in a first virtual machine, and the journal log engine 130 may be implemented in a second virtual machine. Further, in such an example, the first virtual machine may include the volume 150, and the second virtual machine may include the journal 160.

Note that, while FIG. 1 shows one example, implementations are not limited by this example. For example, it is contemplated that the storage system 100 may include any number of computing devices 110 and/or storage devices 140. In another example, it is contemplated that the functionality of the storage engine 120 and/or the journal log engine 130 may be included in a single engine or software, in any another engine or software of storage system 100, in an external system or device (not shown in FIG. 1), in separate virtual computing devices, in a single virtual computing device, or any combination thereof. Further, it is contemplated that the storage system 100 may include additional devices and/or components, fewer components, different components, different arrangements, and so forth. Other combinations and/or variations are also possible.

FIGS. 3 and 4A-4C—Example Process for Generating a Journal

Figure 3:
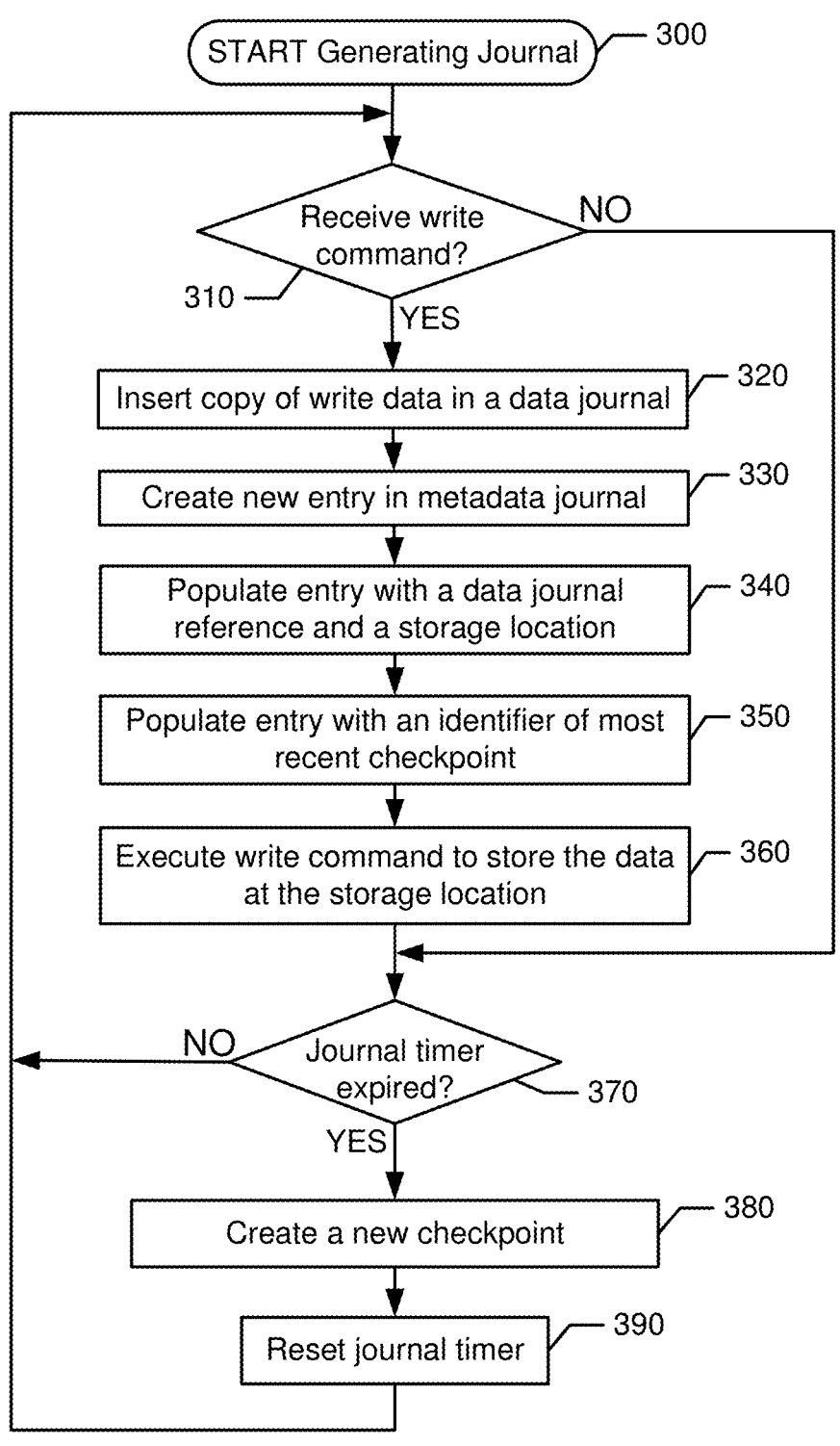
FIG. 3 is an illustration of an example process, in accordance with some implementations.

FIG. 3 shows an example process 300 for generating a journal, in accordance with some implementations. In some examples, the process 300 may be performed by some or all of the storage system 100 (shown in FIG. 1). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 300 may be described below with reference to FIGS. 4A-4C, which show some example implementations. However, other implementations are also possible.

The process 300 may begin at decision block 310, which may include determining whether a write command has been received. Upon a positive determination ("YES"), the process 300 may continue at block 320, including inserting a copy of the write data into a data journal. Block 330 may include creating a new entry in a metadata journal. Block 340 may include populating the entry with a data journal reference and a storage location.

Block 350 may include populating the entry with an identifier of the most recent checkpoint. Block 360 may include executing the write command to store data at the storage location. After block 360, or after a negative determination at decision block 310 ("NO"), the process 200 may continue at decision block 370, including determining whether a journal timer has expired. If it is determined at decision block 370 that the journal timer has not expired ("NO"), the process 300 may return to decision block 310 (i.e., to again determine whether a write command has been received). Otherwise, if it is determined at decision block 370 that the journal timer has expired ("YES"), the process 300 may continue at block 380, including creating a new checkpoint for the journal. Further, block 390 may include resetting the journal timer. After block 390, the process 300 may return to decision block 310.

Figure 4A:
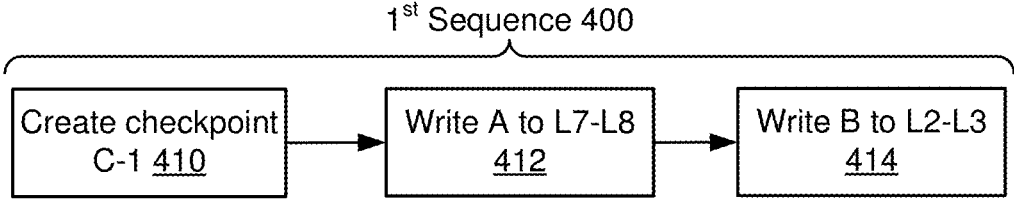
FIGS. 4A-4C are illustrations of example operations, in accordance with some implementations.
Figure 4A:
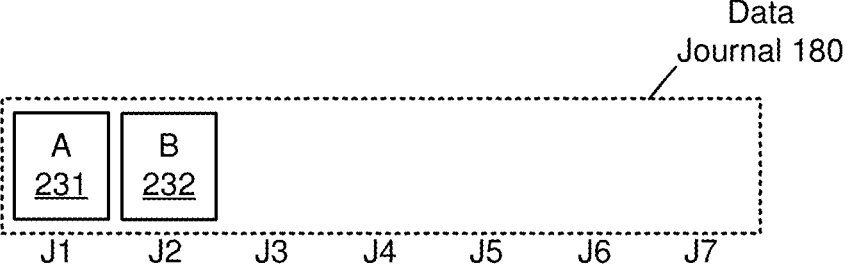
Figure 4A:
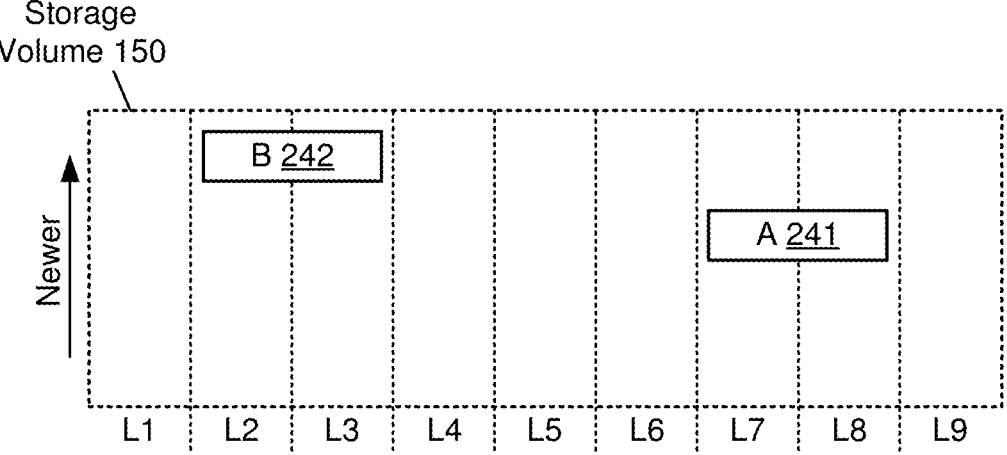

For example, referring to FIG. 4A, shown is an example in which a first sequence 400 (i.e., including blocks 410, 412, 414) is performed a controller (e.g., processing engine(s) included in computing device 110 shown in FIG. 1). As shown, block 410 includes creating a checkpoint C-1 at a first point in time. For example, the controller may detect the expiration of a journal timer, and in response may create or define the checkpoint C-1. In some implementations, the journal timer may be a cyclical timer that indicates (i.e., upon expiring) a desired time period between checkpoints in the journal log (e.g., two second, five seconds, and so forth). In other implementations, the creation of the checkpoint may be triggered by alternative or additional events. For example, a checkpoint may be created in response to a user command, a program instruction, a system interrupt or event (e.g., an error or failure event), and so forth.

Block 412 includes writing the data unit "A" 241 to the range "L7-L8" (e.g., spanning from location "L7" to location "L8" in the storage volume 150). In response to the write 412, the controller stores a copy 231 of data unit "A" in the journal address "J1" of the data journal 180. Further, the controller creates entry "1" in the metadata table 200 to record information regarding the write 412. In particular, the controller populates the entry "1" to include the data identifier "A," the journal address "J1," the storage location "L7-L8," and the checkpoint identifier "C-1" (i.e., the most recent checkpoint that preceded the write 412).

Block 414 includes writing the data unit "B" 242 to the range "L2-L3" in the storage volume 150. In response to the write 414, the controller stores a copy 232 of data unit "B" in the journal address "J2" of the data journal 180. Further, the controller creates entry "2" in the metadata table 200 to record information regarding the write 414. In particular, the controller populates the entry "2" to include the data identifier "B," the journal address "J2," the storage location "L2-L3," and the checkpoint identifier "C-1" (i.e., the most recent checkpoint that preceded the write 414).

Figure 4B:
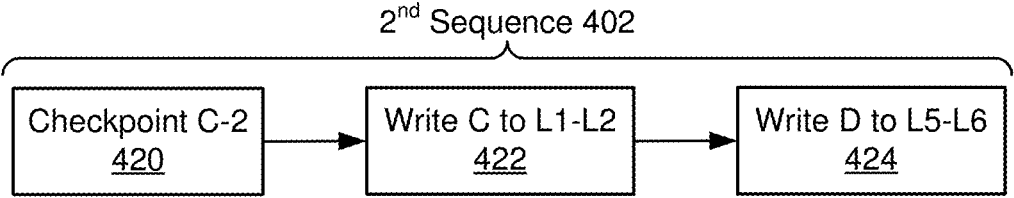
Figure 4B:
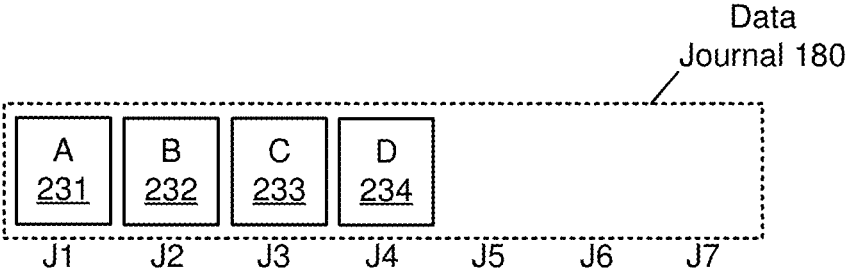
Figure 4B:
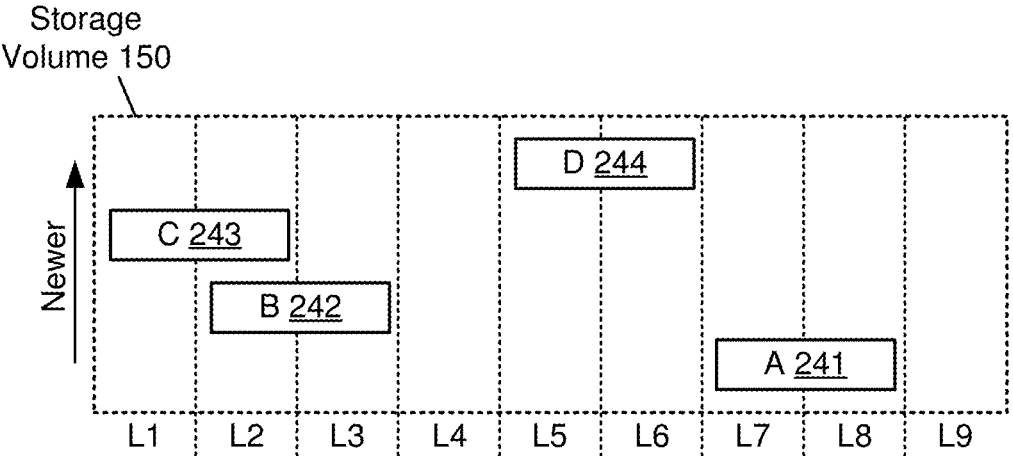

Referring now to FIG. 4B, shown is an example in which the controller performs a second sequence 402 (i.e., including blocks 420, 422, 424) after completing the first sequence 400 (shown in FIG. 4A). As shown, block 420 includes creating a checkpoint C-2 at a second point in time. Block 422 includes writing the data unit "C" 243 to the range "L1-L2." In response to the write 422, the controller stores a copy 233 of data unit "C" in the journal address "J3" of the data journal 180. Further, the controller creates entry "3" in the metadata table 200 to record information regarding the write 422 (i.e., data identifier "C," journal address "J3," storage location "L1-L2," and checkpoint identifier "C-2"). Note that, as shown in FIG. 4B, the write 422 causes the portion of data unit "B" 242 in location "L2" to be over-written by a portion of the data unit "C" 243. However, a remaining portion of data unit "B" 242 (i.e., the portion of data unit "B" 242 that was not overwritten by the write 422) remains stored in location "L3" during the time period illustrated by FIG. 4B.

Block 424 includes writing the data unit "D" 244 to the range "L5-L6" in the storage volume 150. In response to the write 424, the controller stores a copy 234 of data unit "D" in the journal address "J4" of the data journal 180. Further, the controller creates entry "4" in the metadata table 200 to record information regarding the write 424 (i.e., data identifier "D," journal address "J4," storage location "L5-L6," and checkpoint identifier "C-2").

Figure 4C:
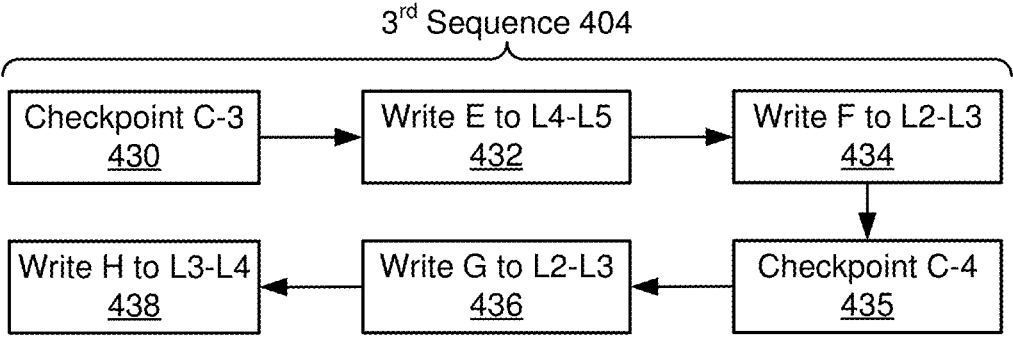
Figure 4C:
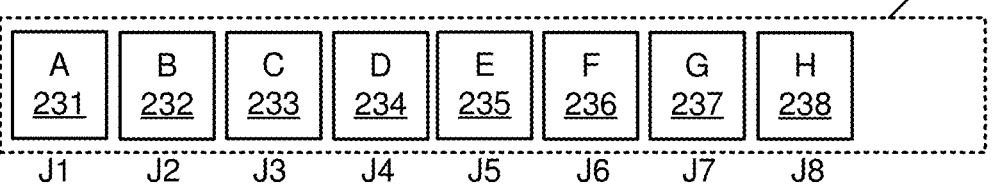
Figure 4C:
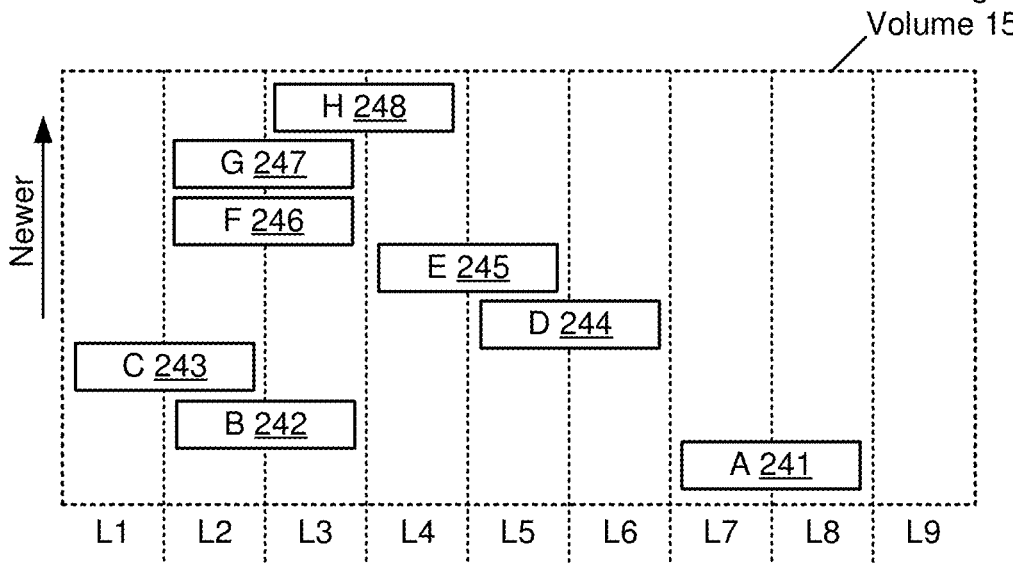

Referring now to FIG. 4C, shown is an example in which the controller performs a third sequence 404 (i.e., including blocks 430, 432, 434. 435, 436, 438) after completing the second sequence 402 (shown in FIG. 4B). As shown, block 430 includes creating a checkpoint C-3 at a third point in time. Block 432 includes writing the data unit "E" 245 to the range "L4-L5." In response to the write 432, the controller stores a copy 235 of data unit "E" in the journal address "J5" of the data journal 180. Further, the controller creates entry "5" in the metadata table 200 to record information regarding the write 432 (i.e., data identifier "C," journal address "J3," storage location "L1-L2," and checkpoint identifier "C-3").

Block 434 includes writing the data unit "F" 246 to the range "L2-L3" in the storage volume 150. In response to the write 434, the controller stores a copy 236 of data unit "F" in the journal address "J6" of the data journal 180. Further, the controller creates entry "6" in the metadata table 200 to record information regarding the write 434 (i.e., data identifier "D," journal address "J4," storage location "L5-L6," and checkpoint identifier "C-2").

Block 435 includes creating a checkpoint C-4 at a fourth point in time. Block 436 includes writing the data unit "G" 247 to the range "L2-L3." In response to the write 436, the controller stores a copy 237 of data unit "G" in the journal address "J7" of the data journal 180. Further, the controller creates entry "7" in the metadata table 200 to record information regarding the write 436 (i.e., data identifier "G," journal address "J7," storage location "L2-L3," and check-point identifier "C-4").

Block 438 includes writing the data unit "H" 248 to the range "L3-L4" in the storage volume 150. In response to the write 438, the controller stores a copy 238 of data unit "G" in the journal address "J8" of the data journal 180. Further, the controller creates entry "8" in the metadata table 200 to record information regarding the write 438 (i.e., data identifier "H," journal address "J8," storage location "L3-L4," and checkpoint identifier "C-4"). Note that, as shown in FIG. 4C, the newer writes (i.e., the more recent writes) may overwrite some or all of the data written by older writes (i.e., the less recent writes) in the storage volume 150.

In some implementations, older entries may be removed from the metadata table 200 (e.g., upon reaching a maximum number or age), and the writes recorded in the removed entries may be executed to generate a mirror volume (e.g., mirror volume 190 shown in FIG. 1). The mirror volume may represent the storage volume 150 as it existed at the time that those removed entries were added to the metadata table 200.

Note that FIGS. 4A-4C show the entries of the metadata table 200 as including a "data identifier" field for the sake of clarity and illustration. However, it is contemplated that metadata table 200 may not include the "data identifier" field in some or all implementations.

Figure 5:
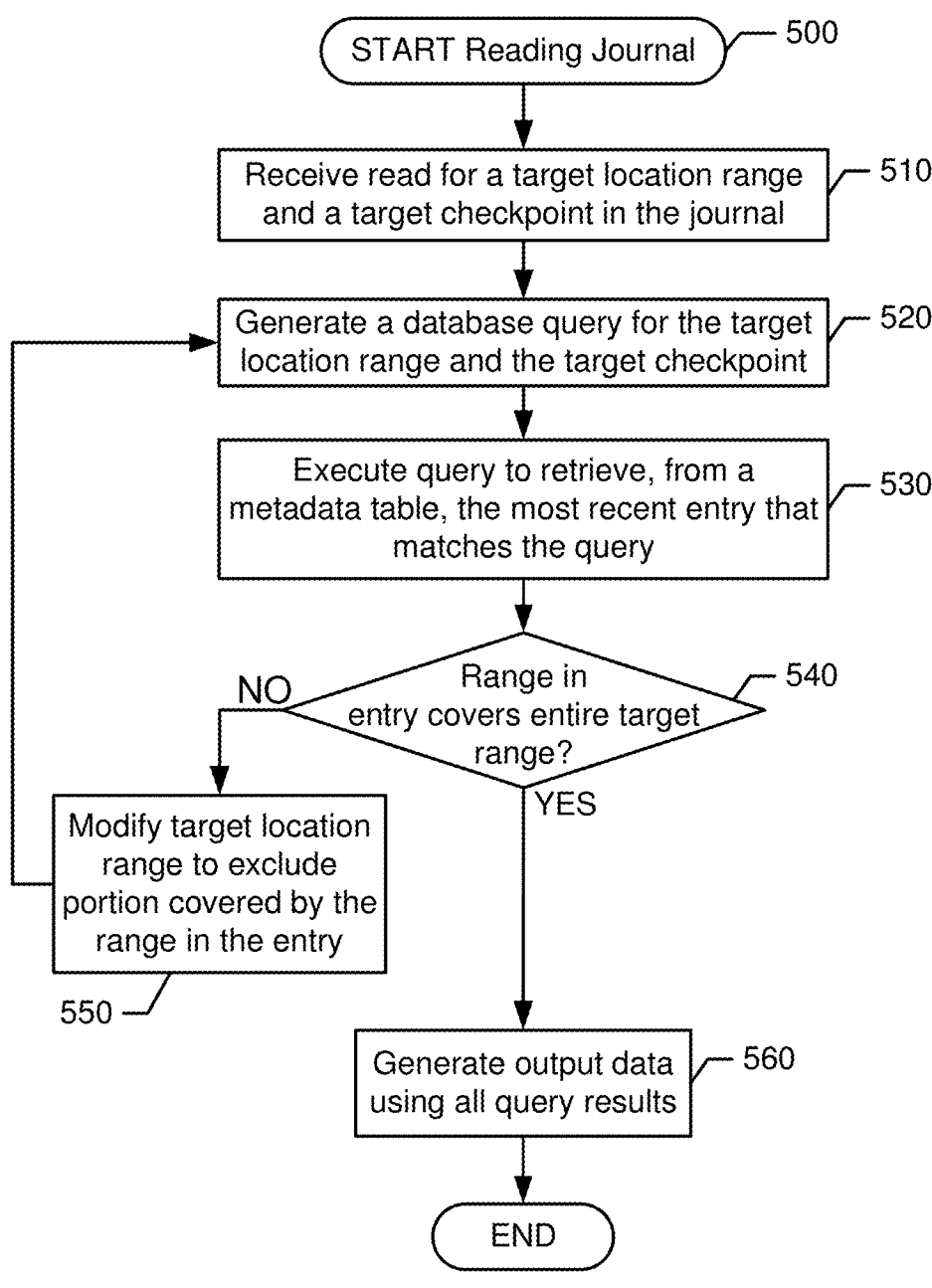
FIG. 5 is an illustration of an example process, in accordance with some implementations.
Figure 6:
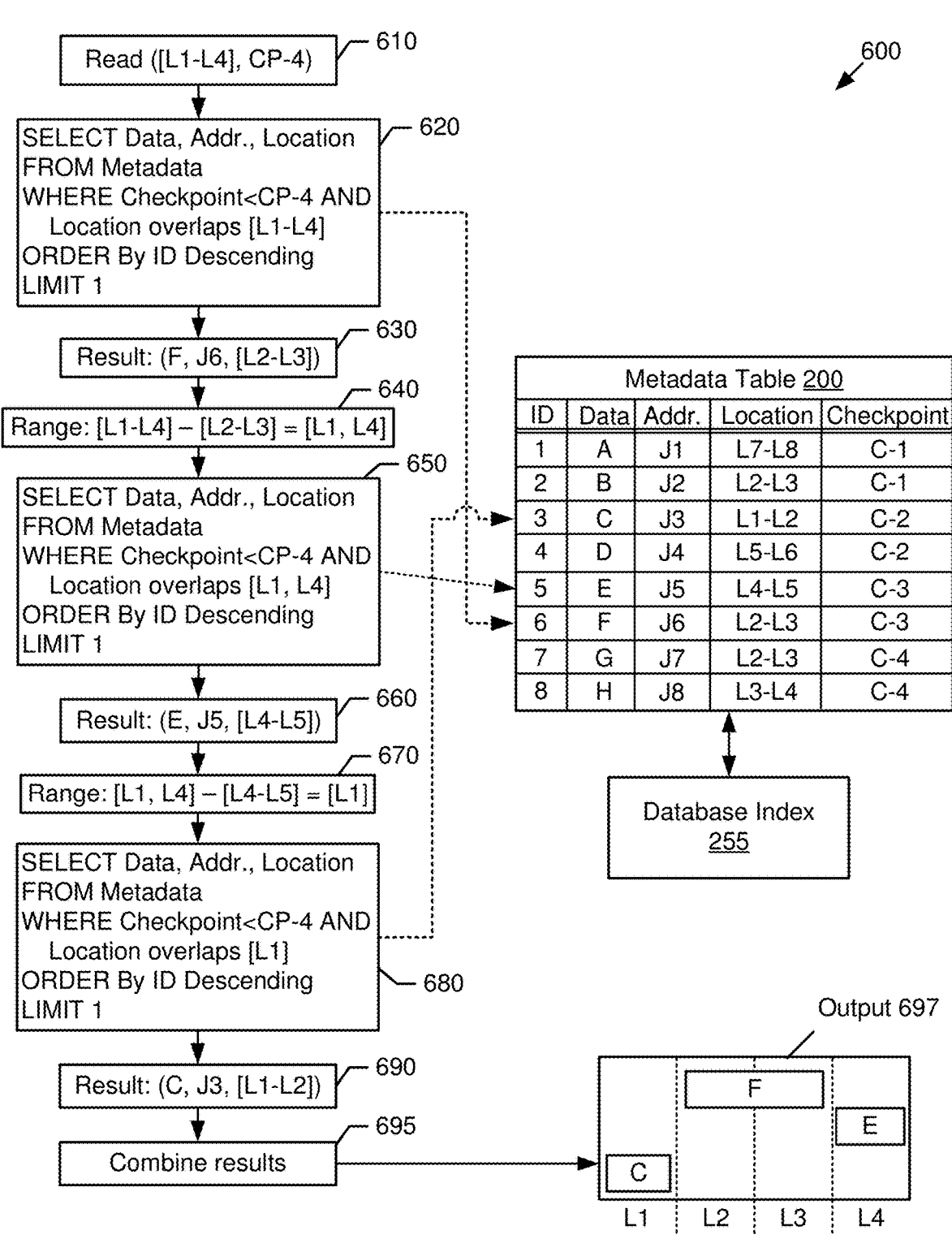
FIG. 6 is an illustration of an example operation, in accordance with some implementations.

FIGS. 5-6—Example Process for Reading a Journal

FIG. 5 shows an example process 500 for reading a journal, in accordance with some implementations. In some examples, the process 500 may be performed by some or all of the storage system 100 (shown in FIG. 1). The process 500 may be implemented in hardware or a combination of hardware and programming (e.g., machine-readable instruc-tions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 500 may be described below with reference to FIG. 6, which shows an example implementation. However, other imple-mentations are also possible.

Block 510 may include receiving a read request for a target location range and a target checkpoint in a journal. Block 520 may include generating a database query for the target location range and the target checkpoint. Block 530 may include executing the query to retrieve, from a metadata table, the most recent entry that matches the query.

Decision block 540 may include determining whether the location range recorded in the entry covers the entire target location range. Upon a negative determination ("NO"), the process 500 may continue at block 550, including modifying the target location range to exclude the portion covered by the range recorded in the entry. After block 550, the process 500 may return to block 520 (i.e., to generate a new query for the modified target location range and the target check-point). In this manner, the blocks 520, 530, 540, 550 may form a loop that is repeated for multiple iterations (i.e., until reaching a positive determination at decision block 540).

As shown in FIG. 5, upon positive determination at decision block 540 ("YES"), the process 500 may continue at block 560, including generating output data using all query results (i.e., the query results from one or more instance of executing queries at block 530). After block 560, the process 500 may be completed. In some implementations, the process 500 may be performed to reconstruct a volume at a checkpoint in a relatively fast and efficient manner, and may thereby provide an efficient allocation of processing and network resources.

For example, referring to FIG. 6, a controller (e.g., storage controller 110 shown in FIG. 1) receives the read command 610 for the target location range "L1-L4" and the target checkpoint "CP-4." Stated differently, the read command 610 is to retrieve the data that was stored in locations "L1," "L2," "L3," and "L4" (e.g., in volume 150 shown in FIG. 1) at the time that the checkpoint "CP-4" was created.

In response to the read command 610, the controller generates a first query 620. In the example illustrated in FIG. 6, the first query 620 is configured to identify, from the metadata table 200 ("FROM Metadata"), a set of table entries that have Checkpoint values that precede the target checkpoint "CP-4" and have storage location ranges that overlap the target range [L1-L4]("WHERE Checkpoint<CP-4 AND Location overlaps [L1-L4]"). Stated differently, the query 620 may identify one or more matching entries that have a checkpoint value smaller (or older) than "CP-4," thereby indicating that each matching entry was entered in the metadata table 200 prior to the creation of target checkpoint "CP-4." Further, each matching entry must record a storage location range that at least partially overlaps the target location range "L1-L4" (i.e., if any portion of the recorded storage location range is also included in any portion of the target location range "L1-L4"). Further, the first query 620 is configured to sort the identified set of table entries in descending order of the "ID" field value, and to limit the query output to a single table entry that is sorted in first place in the descending order ("ORDER By ID Descending LIMIT 1"). Furthermore, the first query 620 is configured to retrieve the Data, Address, and Location fields ("SELECT Data, Addr., Location) from the single table entry that is sorted in first place in the descending order of the "ID" field value. In some implementations, the "ID" field of the table entries may indicate the sequential order that the table entries were created in the metadata table 200. As such, when the identified set of table entries are sorted in the descending order of the "ID" field value (i.e., from newest entry to oldest entry), the single table entry that is sorted in first place is the most recent entry of the identified set of table entries. Stated differently, the output of query 620 is the most recent entry in a subset of table entries, where each of the subset of table entries is older than the target checkpoint "CP-4" and records a location range that at least partially overlaps the target location range [L1-L4].

As shown in FIG. 6, the controller executes the first query 620 to identify the matching entry "6" in the metadata table 200, and to generate the query result 630 using the matching entry "6." In particular, the query result 630 includes metadata recorded in the matching entry "6" of the metadata table 200, namely the data identifier "F," the journal address "J6," and the location range "L2-L3."

The controller determines that the location range "L2-L3" (recorded in entry "6") does not cover (i.e., does not include at least every portion of) the entirety of the target location range "L1-L4." In response to this determination, the controller determines 640 a first modified target location range "L1, L4" (i.e., by excluding the range portion "L2-L3" from the target location range "L1-L4"), and then generates a second query 650 using the first modified target location range "L1, L4."

The controller executes the second query 650 to identify the matching entry "5" in the metadata table 200, and to generate the query result 660 using the matching entry "5." In particular, the query result 660 includes metadata recorded in the matching entry "5" of the metadata table 200, namely the data identifier "E," the journal address "J5," and the location range "L4-L5." Note that, while FIG. 6 illustrates the second query 650 as a single query configured to retrieve data from two disjoint ranges (i.e., the ranges "L1" and "L4"), implementations are not limited in this regard. For example, the second query 650 may be executed as two related queries (or sub-queries) that retrieve data from two disjoint ranges, namely one query for target location range "L1" and another query for target location range "L4." The results of these two related queries may then be combined to generate the query result 660.

The controller determines that the location range "L4-L5" (recorded in entry "5") does not cover the entirety of the first modified target location range "L1, L4." In response to this determination, the controller determines 670 a second modified target location range "L1" (i.e., by excluding the portion "L4-L5" from the first modified target location range "L1, L4"), and then generates a third query 680 using the second modified target location range "L1."

The controller executes the third query 680 to identify the matching entry "3" in the metadata table 200, and to generate the query result 690 using the matching entry "3." In particular, the query result 660 includes metadata recorded in the matching entry "3" of the metadata table 200, namely the data identifier "C," the journal address "J3," and the location range "L1-L2."

The controller determines that the location range "L1-L2" (recorded in entry "3") does cover the entirety of the second modified target location range "L1." In response to this determination, the controller combines 695 the query results 630, 660, 690 (i.e., the results of the executed queries 620, 650, 680) to produce an output 697. In some implementations, the output 697 may include, for each location in the requested target location range "L1-L4," the data portion that was most recently-written to that location. For example, as shown in FIG. 6, the output 697 includes the portion of data unit "C" in location "L1," the data unit "F" in locations "L2-L3," and the portion of data unit "E" in location "L4." In some implementations, the output 697 may be used to restore the state of the target location range as it existed at the time of the target checkpoint.

In some implementations, if multiple queries (e.g., queries 620, 650, 680) are executed against the metadata table 200, and if the combination of the results of these multiple queries fails to cover all locations in the requested target location range "L1-L4," an additional query may be executed against a mirror volume (e.g., mirror volume 190 shown in FIG. 1) to obtain the data for the missing location. Further, the result from the query against the mirror volume may be combined with the results from the previous queries against the metadata table 200, and these combined results may be used to generate the output 697.

In some implementations, the query 620 may include a set of conditions to specify a location range that at least partially overlaps the target location range "L1-L4." For example, assume that, in the entries of the metadata table 200, each storage location is recorded as a starting offset (SO) and an ending offset (EO). Assume also that, in the query 620, each target location range is specified as a starting target location (T) and a target length (L). Further, assume that each write operation recorded in the metadata table 200 has a maximum length (M) (e.g., a maximum write length imposed by the storage system). In this example, the query 620 may specify that a matching entry has to satisfy each of the following conditions: [SO<(T+L)] and [SO>(T−M)] and [EO>T]. As such, the query 620 may be limited such that no entries are returned that begin more than the maximum length M before the start of the target location range, thus limiting the search space. In this manner, the query 620 may be executed without consuming a relatively large amount of processing resources.

Note that, for the sake of clarity and illustration, FIG. 6 shows various elements (e.g., the metadata table 200, the queries 620, 650, 680, and the results 630, 660, 690) as including "data identifier" fields or values. However, it is contemplated that these elements may not include the "data identifier" fields or values in some or all implementations.

Note also that, in the example illustrated in FIG. 6, the descending order of creation for the table entries is determined by sorting the entry identifiers (i.e., row numbers) in descending order. However, implementations are not limited in this regard. For example, in some implementations, the queries 620, 650, 680 may use a database index 255 that indicates, for each storage location in a volume, the entries for writes to that storage location in order of entry creation. The database index 255 may be a data structure that is generated by a database engine, and which is stored (e.g., in persistent storage of the computing device 110 shown in FIG. 1) prior to executing the queries 620, 650, 680. In some implementations, such use of the database index 255 may provide relatively faster execution of the queries 620, 650, 680.

FIG. 7—Example Computing Device

FIG. 7 shows a schematic diagram of an example computing device 700. In some examples, the computing device 700 may correspond generally to some or all of the computing device 110 (shown in FIG. 1A), which may be separate from the storage device 140. As shown, the computing device 700 may include hardware processor 702 and machine-readable storage medium 705 including instructions 710-750. The machine-readable storage medium 705 may be a non-transitory medium. The instructions 710-750 may be executed by the hardware processor 702, or by a processing engine included in hardware processor 702.

Instruction 710 may be executed to receive a read request for journal data, where the read request specifies a target location range and a target checkpoint. For example, referring to FIG. 6, a controller (e.g., storage controller 110 shown in FIG. 1) receives the read command 610 for the target location range "L1-L4" and the target checkpoint "CP-4."

Instruction 720 may be executed to, in response to a receipt of the read request, perform a first query to retrieve a first entry of a metadata table comprising a plurality of entries, where the first entry is a most recent entry in a first subset of entries, and where each of the first subset of entries is older than the target checkpoint and records a write range that overlaps at least some of the target location range. For example, referring to FIG. 6, the controller executes a query 620 that is configured such that a matching entry must have a checkpoint value smaller (or older) than "CP-4," thereby indicating that the matching entry was entered in the metadata table 200 prior the creation of target checkpoint "CP-4." Further, the query 620 is configured such that a matching entry must record a location range that at least partially overlaps the target location range "L1-L4." Furthermore, the query 620 is configured such that, if multiple entries are older than checkpoint "CP-4 and also overlap the target location range "L1-L4," these multiple entries are sorted in descending order of creation in the metadata table 200 (i.e., from newest entry to oldest entry), and the query output is a single entry that is sorted in first place in the descending order (i.e., the most recent entry of the multiple entries). Accordingly, as shown in FIG. 6, the query 620 is executed to identify the matching entry "6" in the metadata table 200, and to generate the query result 630 using the matching entry "6."

Instruction 730 may be executed to determine whether a write range recorded in the first entry covers an entirety of the target location range. Instruction 740 may be executed to, in response to a determination that the write range recorded in the first entry does not cover the entirety of the target location range, determine a remaining portion of the target location range that excludes the write range recorded in the first entry. For example, referring to FIG. 6, the controller determines that the location range "L2-L3" (recorded in the matching entry "6") does not cover (i.e., overlap) the entirety of the target location range "L1-L4." In response to this determination, the controller determines 640 a first modified target location range "L1, L4" (i.e., by excluding the portion "L2-L3" from the target location range "L1-L4").

Instruction 750 may be executed to perform a second query to retrieve a second entry of the metadata table, where the second entry is a most recent record in a second subset of entries that are older that the target checkpoint and record write ranges that overlap at least some of the remaining portion of the target location range. For example, referring to FIG. 6, the controller generates a second query 650 using the first modified target location range "L1, L4." The controller executes the second query 650 to identify the matching entry "5" in the metadata table 200, and to generate the query result 660 using the matching entry "5."

Further, the controller determines that the location range "L4-L5" (recorded in entry "5") does not cover the entirety of the first modified target location range "L1, L4." In response to this determination, the controller determines 670 a second modified target location range "L1" (i.e., by excluding the portion "L4-L5" from the first modified target location range "L1, L4"), and then generates a third query 680 using the second modified target location range "L1." The controller executes the third query 680 to identify the matching entry "3" in the metadata table 200, and to generate the query result 690 using the matching entry "3." Furthermore, upon determining that the location range "L1-L2" (recorded in entry "3") does cover the entirety of the second modified target location range "L1," the controller combines 695 the query results 630, 660, 690 (i.e., the results of the executed queries 620, 650, 680) to produce an output 697. In some implementations, the output 697 may include, for each location in the requested target location range "L1-L4," the data portion that was most recently-written to that location. In some implementations, the output 697 may be used to restore the target location range to a state that existed at a time of the target checkpoint.

FIG. 8—Example Machine-Readable Storage Medium

FIG. 8 shows a machine-readable storage medium 800 including instructions 810-850, in accordance with some implementations. The instructions 810-850 can be executed by a single processor, multiple processors, a single processing engine, multiple processing engines, and so forth, which may be separate from a storage device. The machine-readable medium 800 may be a non-transitory storage medium, such as an optical, semiconductor, or magnetic storage medium. The instructions 810-850 may correspond generally to the examples described above with reference to instructions 710-750 (shown in FIG. 7).

Instruction 810 may be executed to receive a read request for journal data, where the read request specifies a target location range and a target checkpoint. Instruction 820 may be executed to, in response to a receipt of the read request, perform a first query to retrieve a first entry of a metadata table comprising a plurality of entries, where the first entry is a most recent entry in a first subset of entries, and where each of the first subset of entries is older than the target checkpoint and records a write range that overlaps at least some of the target location range.

Instruction 830 may be executed to determine whether a write range recorded in the first entry covers an entirety of the target location range. Instruction 840 may be executed to, in response to a determination that the write range recorded in the first entry does not cover the entirety of the target location range, determine a remaining portion of the target location range that excludes the write range recorded in the first entry. Instruction 850 may be executed to perform a second query to retrieve a second entry of the metadata table, where the second entry is a most recent record in a second subset of entries that are older that the target checkpoint and record write ranges that overlap at least some of the remaining portion of the target location range.

FIG. 9—Example Process for Reading a Journal

FIG. 9 shows an example process 900 for reading a journal, in accordance with some implementations. In some examples, the process 900 may be performed by some or all of the storage system 100 (shown in FIG. 1). The process 900 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 910 may include receiving, by a controller, a read request for journal data, where the read request specifies a target location range and a target checkpoint. Block 920 may include, in response to a receipt of the read request, executing, by the controller, a first query to retrieve a first entry of a metadata table comprising a plurality of entries, where the first entry is a most recent entry in a first subset of entries, and where each of the first subset of entries is older than the target checkpoint and records a write range that overlaps at least some of the target location range.

Block 930 may include determining, by the controller, whether a write range recorded in the first entry covers an entirety of the target location range. Block 940 may include, in response to a determination that the write range recorded in the first entry does not cover the entirety of the target location range, determining, by the controller, a remaining portion of the target location range that excludes the write range recorded in the first entry. Block 950 may include executing, by the controller, a second query to retrieve a second entry of the metadata table, where the second entry is a most recent record in a second subset of entries, and where each of the second subset of entries is older that the target checkpoint and records a write range that overlaps at least some of the remaining portion of the target location range. Blocks 910-950 may correspond generally to the examples described above with reference to instructions 710-750 (shown in FIG. 7).

CONCLUSION

In accordance with some implementations described herein, a metadata journal may record information regarding data writes to a block volume. Further, a data journal may store copies of the data blocks written to the volume. The metadata journal may be implemented as a database table that can include multiple metadata entries. Each metadata entry may store a reference to the copy of the data (stored in the data journal) that was written in the data write. Further, each metadata entry may record a volume address or range where the data was written. In some implementations, each metadata entry may record an identifier of the most recent checkpoint that preceded the creation of that entry. When there is a need to reconstruct the data, a database query is executed for a target address range and a target checkpoint. The query returns the entry for the most recent data write that overlaps the target range, and also precedes the target checkpoint. If the address recorded in the returned entry does not cover the entire target range, the target range is modified to remove the portion recorded in the returned entry, and the query is repeated using the modified target range. This query process may be repeated until obtaining results that cover the entire target range. In this manner, the journal may be used to perform data reconstruction in a relatively fast and efficient manner, thereby reducing the use of processing and network resources.

Note that, while FIGS. 1-9 show various examples, implementations are not limited in this regard. For example, referring to FIG. 1, it is contemplated that the system 100 may include additional devices and/or components, fewer components, different components, different arrangements, and so forth. In another example, it is contemplated that the functionality of the journal engine 130 described above may be included in any another engine or software of the system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing system comprising:

a processor; and a machine-readable storage medium comprising instructions, the instructions executable by the processor to:

receive a read request for journal data, wherein the read request specifies a target location range and a target checkpoint;

in response to a receipt of the read request, perform a first query to retrieve a first entry of a metadata table comprising a plurality of entries, wherein the first entry is a most recent entry in a first subset of entries, and wherein each of the first subset of entries is older than the target checkpoint and records a write range that overlaps at least some of the target location range;

determine whether a write range recorded in the first entry covers an entirety of the target location range;

in response to a determination that the write range recorded in the first entry does not cover the entirety of the target location range, determine a remaining portion of the target location range that excludes the write range recorded in the first entry; and perform a second query to retrieve a second entry of the metadata table, wherein the second entry is a most recent record in a second subset of entries, and wherein each of the second subset of entries is older that the target checkpoint and records a write range that overlaps at least some of the remaining portion of the target location range.

2. The computing system of claim 1, including instructions executable by the processor to:

determine whether a write range recorded in the second entry covers an entirety of the remaining portion of the target location range;

in response to a determination that the write range recorded in the second entry covers the entirety of the remaining portion of the target location range, generate an output using combined results of the first query and the second query.

3. The computing system of claim 2, including instructions executable by the processor to:

restore, using the output, the target location range to a state that existed at a time of the target checkpoint.

4. The computing system of claim 1, including instructions executable by the processor to:

detect a write of a data unit to a storage volume;

in response to a detection of the write:

store a copy of the data unit in a data journal;

generate a new entry of the metadata table; and populate the new entry with a reference to the copy of the data unit stored in the data journal.

5. The computing system of claim 4, including instructions executable by the processor to, in response to the detection of the write:

populate the new entry with a location of the data unit stored in the storage volume; and populate the new entry with an identifier of a checkpoint that was most recently performed prior to the detection of the write.

6. The computing system of claim 4, wherein each entry of the metadata table comprises metadata for a different write to the storage volume.

7. The computing system of claim 1, including instructions executable by the processor to:

sort the first subset of entries in a descending order of creation in the metadata table;

select, from the sorted first subset of entries, a single entry that is sorted first in the descending order, wherein the selected single entry is the first entry retrieved by the first query.

8. The computing system of claim 7, including instructions executable by the processor to:

sort the first subset of entries using a database index, wherein the database index is a stored data structure that indicates, for each storage location of a plurality of storage locations, the entries for writes to that storage location in order of entry creation.

9. The computing system of claim 1, wherein:

in each entry of the metadata table, a write range is recorded as a starting offset (SO) and an ending offset (EO);

in the first query, the target location range is specified as a starting target location (T) and a target length (L);

each write recorded in the metadata table has a maximum write length (M); and the first query specifies that, for each entry of the first subset of entries:

$SO<(T+L)$, $SO>(T-M)$, and $EO>T$.

10. A non-transitory machine-readable storage medium comprising instructions executable by a processor to:

receive a read request for journal data, wherein the read request specifies a target location range and a target checkpoint;

in response to a receipt of the read request, perform a first query to retrieve a first entry of a metadata table comprising a plurality of entries, wherein the first entry is a most recent entry in a first subset of entries, and wherein each of the first subset of entries is older than the target checkpoint and records a write range that overlaps at least some of the target location range;

determine whether a write range recorded in the first entry covers an entirety of the target location range;

in response to a determination that the write range recorded in the first entry does not cover the entirety of the target location range, determine a remaining portion of the target location range that excludes the write range recorded in the first entry; and perform a second query to retrieve a second entry of the metadata table, wherein the second entry is a most recent record in a second subset of entries, and wherein each of the second subset of entries is older that the target checkpoint and records a write range that overlaps at least some of the remaining portion of the target location range.

11. The non-transitory machine-readable medium of claim 10, including instructions executable by the processor to:

determine whether a write range recorded in the second entry covers an entirety of the remaining portion of the target location range;

in response to a determination that the write range recorded in the second entry covers the entirety of the remaining portion of the target location range, generate an output using combined results of the first query and the second query.

12. The non-transitory machine-readable medium of claim 11, including instructions executable by the processor to:

restore, using the output, the target location range to a state that existed at a time of the target checkpoint.

13. The non-transitory machine-readable medium of claim 10, including instructions executable by the processor to:

detect a write of a data unit to a storage volume;

in response to a detection of the write:

store a copy of the data unit in a data journal;

generate a new entry of the metadata table; and populate the new entry with a reference to the copy of the data unit stored in the data journal.

14. The non-transitory machine-readable medium of claim 13, including instructions executable by the processor to, in response to the detection of the write:

populate the new entry with a location of the data unit stored in the storage volume; and populate the new entry with an identifier of a checkpoint that was most recently performed prior to the detection of the write.

15. A method comprising:

receiving, by a controller, a read request for journal data, wherein the read request specifies a target location range and a target checkpoint;

in response to a receipt of the read request, executing, by the controller, a first query to retrieve a first entry of a metadata table comprising a plurality of entries, wherein the first entry is a most recent entry in a first subset of entries, and wherein each of the first subset of entries is older than the target checkpoint and records a write range that overlaps at least some of the target location range;

determining, by the controller, whether a write range recorded in the first entry covers an entirety of the target location range;

in response to a determination that the write range recorded in the first entry does not cover the entirety of the target location range, determining, by the controller, a remaining portion of the target location range that excludes the write range recorded in the first entry; and executing, by the controller, a second query to retrieve a second entry of the metadata table, wherein the second entry is a most recent record in a second subset of entries that are older that the target checkpoint and record write ranges that overlap at least some of the remaining portion of the target location range.

16. The method of claim 15, comprising:

determining whether a write range recorded in the second entry covers an entirety of the remaining portion of the target location range;

in response to a determination that the write range recorded in the second entry covers the entirety of the remaining portion of the target location range, generating an output using combined results of the first query and the second query.

17. The method of claim 16, comprising:

restoring, using the output, the target location range to a state that existed at a time of the target checkpoint.

18. The method of claim 15, comprising:

detecting a write of a data unit to a storage volume;

in response to a detection of the write:

storing a copy of the data unit in a data journal;

generating a new entry of the metadata table; and populating the new entry with a reference to the copy of the data unit stored in the data journal.

19. The method of claim 18, comprising, in response to the detection of the write:

populating the new entry with a location of the data unit stored in the storage volume; and populating the new entry with an identifier of a checkpoint that was most recently performed prior to the detection of the write.

20. The method of claim 18, wherein each entry of the metadata table comprises metadata for a different write to the storage volume.

\* \* \* \* \*